US012574574B2

(12) United States Patent
Chen et al.

(10) Patent No.: US 12,574,574 B2
(45) Date of Patent: Mar. 10, 2026

(54) METHOD, APPARATUS, ELECTRONIC DEVICE AND STORAGE MEDIUM FOR VIDEO BITRATE SWITCHING

(71) Applicant: BEIJING BYTEDANCE NETWORK TECHNOLOGY CO., LTD., Beijing (CN)

(72) Inventors: Jianping Chen, Beijing (CN); Tianyi Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 145 days.

(21) Appl. No.: 18/572,165

(22) PCT Filed: Sep. 14, 2022

(86) PCT No.: PCT/CN2022/118668
§ 371 (c)(1),
(2) Date: Dec. 19, 2023

(87) PCT Pub. No.: WO2023/051243
PCT Pub. Date: Apr. 6, 2023

(65) Prior Publication Data
US 2024/0121455 A1 Apr. 11, 2024

(30) Foreign Application Priority Data
Sep. 29, 2021 (CN) .......................... 202111153984.3

(51) Int. Cl.
*H04N 21/238* (2011.01)
*H04N 21/24* (2011.01)

(52) U.S. Cl.
CPC ... *H04N 21/23805* (2013.01); *H04N 21/2402* (2013.01)

(58) Field of Classification Search
CPC ..................... H04N 21/23805; H04N 21/2402
See application file for complete search history.

(56) References Cited

U.S. PATENT DOCUMENTS

| | | | |
|---|---|---|---|
| 9,621,613 B1 | 4/2017 | Huang et al. | |
| 2015/0067753 A1* | 3/2015 | Shemesh .............. | H04N 21/472 725/116 |

(Continued)

FOREIGN PATENT DOCUMENTS

| | | |
|---|---|---|
| CN | 102291599 A | 12/2011 |
| CN | 109168078 A | 1/2019 |

(Continued)

OTHER PUBLICATIONS

International Patent Application No. PCT/CN2022/118668; Int'l Search Report; dated Nov. 23, 2022; 3 pages.

*Primary Examiner* — Nicholas T Corbo

(74) *Attorney, Agent, or Firm* — BakerHostetler

(57) ABSTRACT

Embodiments of the disclosure provides a method, apparatus, electronic device and storage medium for video bitrate switching. The method includes: in response to a determination that a condition for video bitrate switching is satisfied, determining a target video bitrate to be switched to; determining, based on a playback time of a delivered audio and video frame, target switching data for switching to a target video stream corresponding to the target video bitrate; and in response to a determination that an audio and video frame to be delivered is consistent with the target switching data, delivering audio and video frames in the target video stream to a client in sequence.

18 Claims, 2 Drawing Sheets

(56)        References Cited

U.S. PATENT DOCUMENTS

2017/0223081 A1 *   8/2017   Degrange  ........ H04N 21/44004
2019/0200013 A1 *   6/2019   Wu  ..................... H04N 19/164

FOREIGN PATENT DOCUMENTS

| | | | |
|---|---|---|---|
| CN | 110267100 A | 9/2019 | |
| CN | 110290402 A * | 9/2019 | ......... H04N 21/8547 |
| CN | 110636346 A | 12/2019 | |
| CN | 111601118 A | 8/2020 | |
| CN | 111669619 A | 9/2020 | |
| CN | 112291620 A | 1/2021 | |
| CN | 112637661 A | 4/2021 | |
| CN | 113141514 A | 7/2021 | |
| CN | 113141541 A | 7/2021 | |
| CN | 113905257 A | 1/2022 | |
| WO | WO 2020/034082 A1 | 2/2020 | |

* cited by examiner

IN RESPONSE TO DETECTING THAT A CONDITION FOR VIDEO BITRATE SWITCHING IS SATISFIED, DETERMINE A TARGET VIDEO BITRATE TO BE SWITCHED TO — S110

DETERMINE, BASED ON A PLAYBACK TIME OF A DELIVERED AUDIO AND VIDEO FRAME, TARGET SWITCHING DATA FOR SWITCHING TO A TARGET VIDEO STREAM CORRESPONDING TO THE TARGET VIDEO BITRATE — S120

IN RESPONSE TO DETECTING THAT AN AUDIO AND VIDEO FRAME TO BE DELIVERED IS CONSISTENT WITH THE TARGET SWITCHING DATA, DELIVER AUDIO AND VIDEO FRAMES IN THE TARGET VIDEO STREAM TO A CLIENT IN SEQUENCE — S130

FIG. 1

IN RESPONSE TO DETECTING THAT A CONDITION FOR VIDEO BITRATE SWITCHING IS SATISFIED, DETERMINE A TARGET VIDEO BITRATE TO BE SWITCHED TO — S210

DETERMINE A PLAYBACK TIME OF A DELIVERED AUDIO AND VIDEO FRAME CORRESPONDING TO A CLIENT, AND DETERMINE TARGET SWITCHING DATA OF A TARGET VIDEO STREAM AFTER THE PLAYBACK TIME — S220

IN RESPONSE TO DETECTING THAT AN AUDIO AND VIDEO FRAME TO BE DELIVERED IS CONSISTENT WITH THE TARGET SWITCHING DATA, DELIVER AUDIO AND VIDEO FRAMES IN THE TARGET VIDEO STREAM TO A CLIENT IN SEQUENCE — S230

FIG. 2

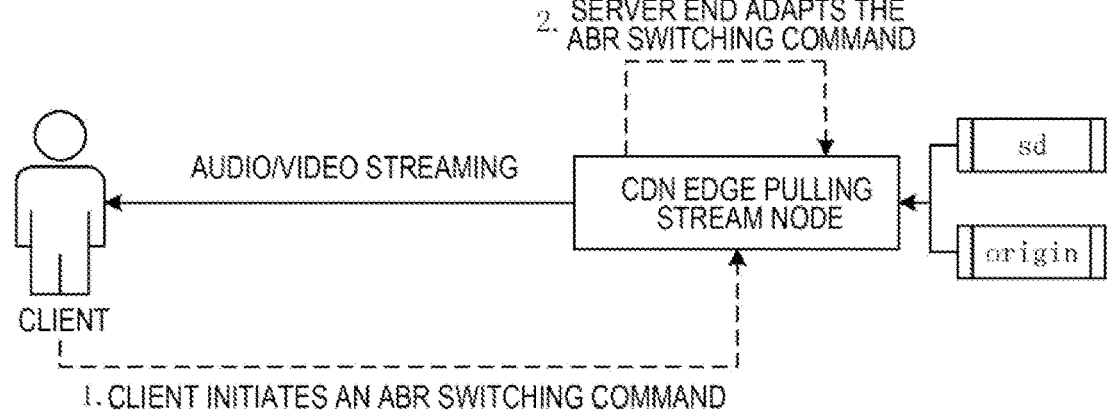

FIG. 3

METHOD, APPARATUS, ELECTRONIC DEVICE AND STORAGE MEDIUM FOR VIDEO BITRATE SWITCHING

The present application is the U.S. National Stage Application of International Patent Application No. PCT/CN2022/118668, filed on Sep. 14, 2022, which claims priority to Chinese Patent Application No. 202111153984.3, filed with the Chinese Patent Office on Sep. 29, 2021, both of which are incorporated herein by reference in their entireties.

FIELD

The present disclosure relates to the field of media transmission, for example, to a method, apparatus, electronic device and storage medium for video bitrate switching.

BACKGROUND

In related technology of media live streaming service, when implementing an adaptive bitrate scheme based on a mainstream streaming media network transmission protocol, a basic idea is to first generate a plurality of streams with the same content, and then slice these streams to generate a plurality of small sharding files. Client may select sharding at different bitrates according to an adaptive bitrate (ABR) control strategy, thereby switching between different bitrates.

In order to reduce the delay introduced by file slicing, a scheme for audio and video streaming similar to FLV is generally used in live stream scenarios. However, streaming does not generate sharding index files, so it is impossible to locate boundaries of audio and video frames. If the client wants to achieve ABR code control function, it must re-establish a connection with the server end, that is, request a new live stream to the server end. It introduces a problem of switching between two video streams in the client, which requires staff to add new playback logic. Meantime, the client's request for two live streams will inevitably cause competition for network bandwidth, which will affect the quality of live streaming in low-bandwidth scenarios and reduce user's viewing experience.

SUMMARY

Embodiments of the present disclosure provides a method, apparatus, electronic device and storage medium for video bitrate switching, so that only one link between the server end and the client is needed to switch the video bitrate. It avoids the bandwidth competition caused by client requesting two streams simultaneously.

In a first aspect, embodiments of the present disclosure provide a method for video bitrate switching, the method applied to the server end and comprising:

in response to a determination that a condition for video bitrate switching is satisfied, determining a target video bitrate to be switched to;

determining, based on a playback time of a delivered audio and video frame, target switching data for switching to a target video stream corresponding to the target video bitrate; and in response to a determination that an audio and video frame to be delivered is consistent with the target switching data, delivering audio and video frames in the target video stream to a client in sequence.

In a second aspect, embodiments of the present disclosure provide an apparatus for video bitrate switching applied to a server end, the apparatus comprising:

a target video bitrate determination module configured to in response to a determination that a condition for video bitrate switching is satisfied, determine a target video bitrate to be switched to;

a target switching data determination module configured to determine, based on a playback time of a delivered audio and video frame, target switching data for switching to a target video stream corresponding to the target video bitrate; and an audio and video frame delivering module configured to in response to a determination that an audio and video frame to be delivered is consistent with the target switching data, deliver audio and video frames in the target video stream to a client in sequence.

In a third aspect, embodiments of the present disclosure also provide an electronic device, the electronic device comprising:

one or more processors, and a storage device configured to store one or more programs, the one or more programs when executed by the one or more processors, causing the one or more processors to implement a method for video bitrate switching according to any one of embodiments of the present disclosure.

In a fourth aspect, embodiments of the present disclosure further provide a storage medium comprising computer-executable instructions, the computer-executable instructions when executed by a processor of a computer, configured to perform a method for video bitrate switching according to according to any one of embodiments of the present disclosure when executed by a computer processor.

BRIEF DESCRIPTION OF THE DRAWINGS

FIG. 1 is a flowchart of a method for video bitrate switching according to an embodiment of the present disclosure;

FIG. 2 is a flowchart of a method for video bitrate switching according to an embodiment of the present disclosure;

FIG. 3 is a flowchart of a method for video bitrate switching according to an embodiment of the present disclosure;

DETAILED DESCRIPTION

Figure 4:
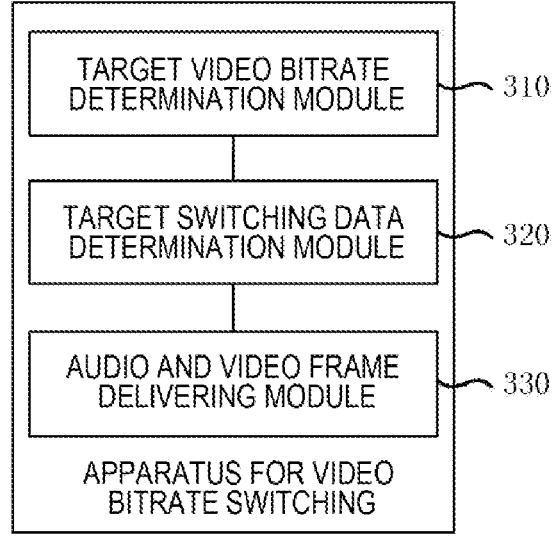
FIG. 4 is a block diagram of an apparatus for video bitrate switching according to an embodiment of the present disclosure.

It should be understood that the steps described in the method embodiments of the present disclosure may be performed in a different order and/or in parallel. Furthermore, the method embodiments may include additional steps and/or omit performing the illustrated steps. The scope of the present disclosure is not limited in this regard.

As used herein, the term "include" and its variants should be construed as open terms meaning "including, but not limited to". The term "based on" means "at least partially based on". The term "one embodiment" means "at least one embodiment". The term "another embodiment" means "at least one another embodiment". The terms "some embodiments" means "at least some embodiments". Related definitions of other terms will be given in the following descriptions.

It should be noted that the concepts of "first" and "second" mentioned in this disclosure are only used to distinguish different devices, modules, or units, and are not used to limit the order or interdependence of the functions performed by these devices, modules, or units.

It should be noted that the modifications of "a" and "a plurality" mentioned in the present disclosure are schematic rather than limiting, and it should be understood by those skilled in the art that unless otherwise explicitly stated in the context, they should be understood as "at least one".

FIG. 1 is a schematic flowchart of a method for video bitrate switching according to an embodiment of the present disclosure. The present embodiment is applicable to the case of video bitrate switching based on a server end, and the method may be performed by an apparatus for video bitrate switching. The apparatus may be implemented in the form of software and/or hardware, and the hardware can be an electronic device, such as a mobile terminal, PC or server.

Before further explaining this disclosure, nouns and terms involved in embodiments of this disclosure will be explained. The nouns and terms involved in embodiments of this disclosure are applicable to the following explanations:

1) Streaming media technology refers to the technology of compressing a series of media data and transmitting them in segments in a streaming manner in the network, to achieve real-time transmission of audio and video data in the network. It is widely used in fields such as network video live stream.

2) Streaming media network transmission protocol refers to the standard that allows two or more terminals in the transmission system to propagate streaming media data in any physical medium. There are four mainstream streaming media network transmission protocols, including Adobe's HTTP Dynamic Streaming (HDS), Apple's HTTP Live Streaming (HLS), Microsoft's Microsoft Smooth Streaming (MSS), and the international standard MPEG Dynamic Adaptive Streaming over HTTP (MPEG-DASH).

3) Server end: services are provided to clients based on targeted service programs, the service content including providing resources to clients and saving data of the clients. In this embodiment, the server end of media live streaming may at least obtain or push audio and video frames from clients through publish streaming or pull streaming.

4) Client: also referred to as a user end, it may be a program that provides local services to users, corresponding to the server end, and needs to cooperate with the server end to run. In this embodiment, the client may receive audio and video frames and display the received audio and video frames to the user through a specific window.

5) Video bitrate: refers to the number of data bits transmitted per unit time during data transmission, usually in kilobits per second (kbps), also referred to as sampling rate. The larger the sampling rate per unit time, the higher the accuracy, and the closer the processed file is to the original file. Those skilled in the art should understand that within a certain numerical range, the higher the video bitrate, the better the imaging quality. Correspondingly, in the process of improving the video bitrate, as the amount of video data increases, the required internet bandwidth increases.

6) Adaptive bitrate adaptation (ABR): a video transmission technology that may perceive changes in the network environment and automatically make reasonable bitrate adjustments based on the playback situation of the client, improving the user's viewing experience and quality of the video, including various algorithms such as rate-based algorithms and buffer-based algorithms.

As shown in FIG. 1, the method of this embodiment includes the following.

S110, in response to detecting that a condition for video bitrate switching is satisfied, it is determined to switch to a target video bitrate.

In the embodiment, it should be noted that, before the server end transmitting audio and video frames to the client, a data transmission link between them may be first established. After the transmission link is completed, the server end may deliver the audio and video frames to the client based on the streaming media network transmission protocol in sequence.

When the server end transmits audio and video frames based on the streaming media network transmission protocol, it may need to switch the definition of the played video with changes in network status or user requests during client playback. For the server end, based on the proportional relationship between bitrate and definition, under a certain resolution, the process of video definition switching is the process of adjusting the video bitrate. For example, based on the adaptive bitrate (ABR) algorithm, when the broadband rate drops from 1 MB/s to 256 KB/s, the video definition needs to be changed from ultra definition to standard definition; or, when the user actively performs a definition switching operation in the client, the server end also needs to adjust the bitrate of the currently transmitted video.

In view of this, the video bitrate switching condition may be a parameter threshold predetermined in advance to characterize the network state, such as a threshold set for broadband rate, or a video sharpness adjustment request received by the server end. It is to be understood that the server end may determine whether to switch the bitrate of the transmitted video in the current state based on the video bitrate switching condition.

Correspondingly, during the process of video data transmission, if the video bitrate switching condition is detected to have been satisfied, the server end may specify that the client needs to receive audio and video frames of a new bitrate based on the network environment or user request. That is, the determined new video bitrate is the target video bitrate. For example, if the current video bitrate is 512 kbps, and the server end determines that the video bitrate switching condition has been met based on the network environment or user request, it is also clear that the client needs to improve the video definition, that is, the client needs to receive audio and video frames such as 1024 kbps. Therefore, the target video bitrate is 1024 kbps, which means adjusting the video from high definition to ultra definition for the client. Similarly, when the video definition needs to be reduced, the target video bitrate may be 256 kbps, which means adjusting the video from high definition to standard definition for the client.

In this embodiment, if the server end detects that the video bitrate switching condition has been satisfied, in order to avoid data transmission confusion, it is not necessary to directly change the bitrate of the currently sent audio and video. A multimedia data stream that meets the target video bitrate requirements may be pulled at the server end. Alternatively, a plurality of clients corresponding to the server end, a multimedia data stream received by a client may be the video stream corresponding to the target bitrate. At this time, the video of the target bitrate may not be pulled.

By way of example, in the actual live stream scenario, the server end may receive audio and video frames between the client on the basis of the original link, to continue transmitting the original video bitrate audio and video frames.

It is to be understood that the present technical solution is to continue transmitting the video stream corresponding to the original video bitrate based on the existing link when the current bitrate switching condition is detected, and the target bitrate to be switched to is determined.

S120, target switching data corresponding to the target video bitrate to be switched to is determined based on a playback time of a delivered audio and video frame.

Herein, the playback time refers to time information corresponding to a last audio and video frame of the audio and video frames that has been delivered to the client by the server end. The target video stream is a video stream that is consistent with the target video bitrate. A video stream may include a plurality of video frames, and the plurality of video frames may include valid video frames and meaningless video frames. For example, a video frame delivered to the client that cannot be decoded and converted into a corresponding video image may be referred to as a meaningless video frame. Conversely, a video frame that may be converted into a corresponding video image is a valid video frame, that is, a keyframe. The data corresponding to the valid video frame may be used as the target switching data. It is also to be understood that the target switching data is a switching point from a video stream corresponding to an original video bitrate to a video frame of the target video bitrate.

For example, the server end and the client receiving audio and video frames may continue to transmit data under the conditions of the original data transmission link. Therefore, when the server end determines the target video bitrate, and does not switch the video stream played by the client, audio and video frames may continue to be delivered to the client at the original bitrate of the video stream on the basis of the original link.

For example, a client may receive a plurality of audio and video frames, each of which has a specific corresponding timestamp. For these video stream data that have been delivered by the server end, a timestamp of a video frame that has been delivered and is closest to the current time may be determined as the playback time. Those skilled in the art should understand that before the playback time, the client always accepts the video frame data corresponding to the original bitrate.

In the present embodiment, after the server end determines the playback time of the delivered video frame, in order to achieve seamless switching of audio and video in the subsequent process of changing the video bitrate, the target switching data may be determined in the stream corresponding to the pulled target video bitrate. It is to be understood that the target switching data is audio and video frames that meet the target video bitrate requirements after the playback time.

It is also to be noted that, before the target switching data is delivered to the client, a video frame before the target switching data may be delivered at the original bitrate to the client.

By way of example, in an actual live stream scenario, based on the audio and video frames delivered by the server end, a timestamp corresponding to the last audio and video frame may be determined. The server end may determine effective audio and video frames corresponding to the time-stamp in the target video stream based on the determined timestamp. It is to be understood that the effective audio and video frames determined in the target video stream are the target switching data.

S130, in response to detecting that an audio and video frame to be delivered is consistent with the target switching data, audio and video frames in the target video stream are delivered to the client in sequence.

In this embodiment, audio and video frames to be delivered at the server end includes audio and video frames corresponding to the original video bitrate and audio and video frames corresponding to the target video bitrate. Therefore, in response to detecting that the audio and video frame to be delivered is consistent with the target switching data, the server end needs to deliver the audio and video frames after the playback time to the client. That is, the server end needs to deliver the audio and video frames corresponding to the target video bitrate to the client based on the current data transmission link.

By way of example, in an actual live stream scenario, the video bitrate of the original video stream played by the client is 512 kbps, and the target video bitrate determined by the server end is 1024 kbps. In response to detecting that the audio and video frame to be delivered matches the target switching data, the server end needs to switch the audio and video frames with a bitrate of 512 kbps in the original link to audio and video frames with a bitrate of 1024 kbps. That is, the server end needs to start with the target switching data and deliver the audio and video frames with a bitrate of 1024 kbps in the target video stream to the client in sequence. In this way, the bitrate of the video received by the client is switched from 512 kbps to 1024 kbps.

By delivering audio and video frames in the target video stream in sequence to the client in detecting of the audio and video frames in the target video stream being consistent with the target switching data, it not only changes the bitrate of the audio and video frames received by the client. It should also be noted that because the server end delivers audio and video frames in the target video stream to the client based on the original link, the client only receives audio and video frames in one video stream at the same time. It avoids the situation where the client receives duplicate content. At the same time, the determined playback time is used as the switching point between the audio and video frames at the original visual bitrate and the audio and video frames at the target video bitrate, achieving seamless connection of audio and video and avoiding black screens.

It should be noted that, after the bitrate adjustment is completed, based on the ABR code control function, the audio and video stream corresponding to the target video bitrate may also be used as the current audio and video stream, and continue to change the video bitrate in the subsequent playback process according to the scheme in this embodiment, so as to achieve dynamic adjustment of the video bitrate.

The technical solution of this embodiment is applied to the server end. If the condition for video bitrate switching is detected to be satisfied, the target video bitrate to be switched to is determined. Based on the playback time of the delivered audio and video frame, the target switching data of the target video stream corresponding to the target video bitrate is determined, that is, the server end determines the basis for switching the video stream. In response to detecting that an audio and video frame to be delivered is consistent with the target switching data, audio and video frames in the target video stream are delivered to the client in sequence, so that the client only needs one link during the process of switching the video bitrate, which not only avoids the tedious process of creating a new link and increasing the playback logic, but also ensures the seamless connection of different bitrate audio and video frames; at the same time, relying on a single link between the server end and the client for bitrate switching directly avoids the bandwidth competition caused by the client requesting two streams at the same time, and the bitrate switching process will not affect the quality of the live stream.

FIG. 2 is a flowchart of method for video bitrate switching according to an embodiment of the present disclosure. Based on the above-described embodiments, the client may send a request for bitrate switching, or the server end may record network status information, and then determine the video bitrate switching condition to ensure the flexibility of the scheme when implementing the ABR function. A playback time and target switching data of a delivered audio and video frame is determined. In response to detecting that the timestamp of the delivered audio and video frame is inconsistent with the target timestamp, the transmission of audio and video frames in the original video stream is maintained. Only when the two are consistent, will the audio and video frames in the target video stream be delivered to the client, which not only ensures the seamless connection of audio and video while changing the video bitrate, but also avoids data confusion. The specific implementation may refer to the technical solution of the present embodiment. Among them, the same or corresponding technical terms as the above embodiments are not repeated here.

As shown in FIG. 2, the method includes the following steps.

S210, in response to detecting that the condition for video bitrate switching is satisfied, a target video bitrate to be switched to is determined.

For example, if a request for bitrate switching sent by a client is received, the target video bitrate to be switched to is determined based on the bitrate parameter carried in the request for bitrate switching.

In this embodiment, on one hand, after establishing a link between the client and the server end and starting a pulling of stream, the current audio and video stream may be determined by the ABR algorithm based on the buffer. When the determination result indicates that the current video bitrate needs to be adjusted, a request for bitrate switching may be sent to the server end based on a specific transmission protocol. Among them, the transmission protocols include Hyper Text Transfer Protocol (HTTP) and Hyper Text Transfer Protocol Secure (HTTPS), etc. On the other hand, corresponding controls may be developed in the client to enable users to actively send the request for bitrate switching to the server end. For example, in relevant applications in the live stream field, a definition adjustment control may be developed. When users want to improve the video definition, the control may be triggered by touch. At the same time, when the client detects that the user triggers the control, it will send a request for bitrate switching to the server end.

In the request for bitrate switching sent by the client, there is also a bitrate parameter. That is, in the client, a mapping table that characterizes the correspondence between video definitions and bitrates is stored in advance. When the target definition to which the video needs to be adjusted is determined, the corresponding bitrate may be obtained by looking up the table. For the server end, the corresponding bitrate parameter may be extracted by parsing the request for bitrate switching, and then the target video bitrate may be determined.

For example, when audio and video frames are delivered to the client, the network state corresponding to the client is recorded. When the network state changes, it is determined that the condition for video bitrate switching is satisfied. Based on the network state, the target video bitrate to be switched to is determined.

In the present embodiment, in addition to the client sending the request for bitrate switching to the server end, the server end may also actively perform bitrate switching operation at a specific time.

For example, when the server end delivers audio and video frames to the client, it may simultaneously record the network status information during the data transmission process, such as network speed, data transmission volume, round-trip time (RTT), and packet loss rate during data transmission. When the network status changes, the ABR algorithm pre-deployed in the server end may determine the performance and operating status of the current communication network, so that the server end may automatically determine whether to adjust the bitrate of the delivered audio and video to improve the user's viewing experience.

For example, the server end stores a mapping table that represents the correspondence between a plurality of network speed intervals (i.e., a plurality of internet bandwidths) and video bitrates. When the network speed changes (such as the Internet bandwidth changing from 50 Mbps to 10 Mbps), the server end may determine whether the current data transmission status meets the condition for video bitrate switching based on the pre-deployed ABR algorithm based on network bandwidth. When it is determined that the condition for bitrate switching is satisfied, the target video bitrate corresponding to the new Internet bandwidth may be determined by looking up the table.

S220, a playback time of a delivered audio and video frame corresponding to the client is determined, and the target switching data of the target video stream after the playback time is determined.

In this embodiment, the server end sends audio and video frames to the client in the form of audio and video frames. At the same time, for a single video frame, there is a specific timestamp corresponding to it. Those skilled in the art should understand that timestamp may at least authenticate the generation time of data. It is a type of data generated using digital signature technology. The signed object includes original file information, signature parameters, signature time and other information, which will not be repeated here.

In view of this, when the server end determines the playback time of the audio and video frames that have been issued, information of the next timestamp after the playback time may be obtained. The audio and video frames corresponding to the timestamp may be determined as the target switching data in the target video stream. It is to be understood that the target switching data includes the target switching audio and video frame and the target switching timestamp.

By way of example, the server end has determined that the second after the reference time is the playback time based on the current time. Based on this, in the video stream pulled by the server end corresponding to the target video bitrate 1024 kbps, the first key frame (I frame) two seconds later may be determined as the target switching audio and video frame, and the timestamp corresponding to this frame is the target switching timestamp, which together constitute the target switching data.

S230, in response to detecting that the timestamp of an audio and video frame to be delivered is the same as the target switching timestamp of the target switching audio and video frame in the target switching data, the audio and video frames in the target video stream are delivered to the client in sequence.

In the present embodiment, after the server end determines the target switching data, if the detected timestamp of the to be delivered audio and video frame is consistent with the target switching timestamp, the transmission of audio and video frames corresponding to an original video bitrate may be stopped in the data transmission link between the client, and a plurality of audio and video frames in the target data stream from the target switching audio and video frame in the target switching data are transmitted to the client in sequence.

Regarding the process that target data stream in a plurality of audio and video frames delivered to the client in sequence, it is also to be understood that a plurality of audio and video frames with timestamps after the target switching timestamp in the target audio and video stream are delivered to the client in sequence.

Continuing with the above example, when the server end detects that the timestamp of the audio and video frames to be delivered reaches the timestamp corresponding to the I frame in the target video stream two seconds later, it may stop sending audio and video frames in the video stream corresponding to the original video bitrate of 512 kbps, and start from the I frame in the target video stream corresponding to the target video bitrate of 1024 kbps, and send a plurality of audio and video frames to the client in turn. It is to be understood that the group of pictures (GOP) displayed when the client plays the original video bitrate to two seconds is the last group of pictures sent by the server end based on the original video stream. Correspondingly, after the audio and video is played in the client for two seconds, the I frame in the GOP group displayed at the next moment is the first group of pictures sent by the server end based on the target video stream. Those skilled in the art will understand that the GOP-based transcoding method is only used as an example to explain the specific steps in this embodiment. In the live streaming scenario, the specific transcoding method should be selected according to the actual situation, and this disclosed embodiment is not specifically limited here.

It should be noted that when the timestamp of the audio and video frame to be delivered is detected to be inconsistent with the target switching timestamp of the target switching audio and video frame in the target switching data, the audio and video frames to be delivered corresponding to the original video bitrate is sent to the client.

In this embodiment, in order to avoid data transmission confusion during the video bitrate switching process, when the server end detects that the timestamp of the audio and video frames to be delivered is inconsistent with the target switching timestamp, it indicates that the client does not need to receive the audio and video frames corresponding to the target video bitrate. At this time, in the link between the server end and the client, audio and video frames corresponding to the original video bitrate may be continuously sent in a manner related to the relevant technology until the timestamp of the audio and video frame to be delivered is consistent with the target switching timestamp. On this basis, those skilled in the art should understand that the original video bitrate is the bitrate before switching to the target video bitrate.

Continuing with the above example, when the server end detects that the timestamp of the audio and video frames to be delivered has not yet reached the timestamp corresponding to the I frame after two seconds in the target video stream, it may continuously send audio and video frames in the video stream corresponding to the original video bitrate 512 kbps based on the data transmission link with the client until the timestamp of the audio and video frames to be delivered reaches the timestamp corresponding to the I frame after two seconds in the target video stream.

The technical solution of this embodiment may send a request for bitrate switching by the client, or record network status information at the server end, and then determine the video bitrate switching conditions to ensure the flexibility of the scheme when implementing the ABR function; determine the playback time of the delivered audio and video frames and the target switching data, and maintain the transmission of audio and video frames in the original video stream when the timestamp of the delivered audio and video frames to be detected is inconsistent with the target timestamp. When the two are consistent, the audio and video frames in the target video stream are sent to the client, which not only ensures the seamless connection of audio and video while changing the video bitrate, but also avoids data confusion.

For example, FIG. 3 is a flowchart of a method for video bitrate switching provided in an embodiment of the present disclosure. In order to clearly introduce the technical solution of the present embodiment, the application scenario of video bitrate switching based on server end may be used as an example, but it is not limited to the above scenario and can be applied to various situations where video bitrate switching is required.

Referring to FIG. 3, the server end may be an information delivery network (Content Delivery Network, CDN) edge pull-based streaming node. In the live streaming scenario, streaming and network distribution of data is usually provided by the CDN server end, also known as the content delivery network. It is an intelligent virtual distributed network built on the network foundation in related technologies. It relies on edge servers deployed in many places to enable users to obtain the required Streaming Media content nearby through the Load Balance, information delivery, scheduling and other functional modules of the central platform, thereby reducing network congestion and improving response speed and hit rate of user access. As shown, in the entire process of this embodiment, only one data transmission link needs to be maintained between the CDN server end and the client. At the same time, while implementing the ABR function, the server end may trigger bitrate switching action through the client or itself.

Continuing to refer to FIG. 3, in a first approach, when the client establishes a link with the server end such as Real Time Messaging Protocol (RTMP) to start pull-based streaming, the ABR algorithm such as buffer may be used to determine whether the video bitrate needs to be switched during the current audio and video frames transmission process. When it is determined that the video bitrate needs to be adjusted, that is, when the video is played at a bitrate higher or lower than the current bitrate (i.e. the target bitrate), a request for bitrate switching may be sent to the server end based on a specific protocol, including HTTP, HTTPS, HTTP2, etc. When the server end receives the request, the original stream origin between the server end and the audio and video frame source may remain unchanged, and another stream may be pulled according to the target bitrate carried in the request. By matching the keyframe timestamp in the video stream, the switching point between two different bitrate videos may be determined. When the timestamp of the audio and video frames to be delivered is consistent with the timestamp of the switching point, the audio and video frames corresponding to the original video bitrate in the link between the server end and the client is switched to the audio and video frames corresponding to the target bitrate, so as to achieve bitrate switching based on the ABR algorithm in the live streaming scene.

Continuing to refer to FIG. 3, in a second approach, when the client establishes a link with the server end based on a transmission protocol such as RTMP and starts pull-based streaming, the server end may record the network status, such as RTT and packet loss rate, during the process of sending audio and video frames. After recording the above information, it may determine whether the video bitrate needs to be switched during the current audio and video frame transmission process based on the ABR algorithm of the server (such as the ABR algorithm based on network bandwidth). When it is determined that the video bitrate needs to be adjusted, that is, the video needs to be played at a bitrate higher or lower than the current bitrate (i.e., the target bitrate), the subsequent processing process is similar to the operation in the first approach when the server end receives a request for bitrate switching, and will not be repeated here.

It should be noted that in the specific video transcoding process at the server end, the frame boundary and timestamp need to be aligned. Specifically for GOP picture groups, the interval of I frames does not need to be aligned, and the frame rate does not need to be aligned. On this basis, the start and end times of the GOP picture group obtained through transcoding are consistent. Secondly, during the transcoding process, unless a new compile codec is specified, the codec must be the same to avoid the client receiving video data encoded by different codec codes. Furthermore, for the supplemental enhancement information (SEI) in the video, it is necessary to pass-through during transcoding to avoid the situation where the SEI may not be aligned with the original video frame when the frame rate changes. In the specific audio transcoding process at the server end, the audio sampling rate and channel number must be kept unchanged, otherwise the client will not be able to decode normally.

The above technical solution enables the client to only need one link in the process of switching the video bitrate, which not only avoids the tedious process of creating a new link and increasing the playback logic, but also ensures the seamless connection of audio and video frames of different bitrates. At the same time, relying on a single link between the server end and the client for bitrate switching directly avoids the bandwidth competition caused by the client requesting two streams at the same time, and the bitrate switching process will not affect the quality of live streaming.

FIG. 4 is a structural diagram of an apparatus for video bitrate switching provided in an embodiment of the present disclosure, which may execute any method for video bitrate switching provided in any embodiment of the present disclosure, and has corresponding functional modules and beneficial effects of the execution method. As shown in FIG. 4, the apparatus includes: a target video bitrate determination module 310, a target switching data determination module 320, and an audio and video frame delivering module 330.

The target video bitrate determination module 310 is configured to in response to detecting that a condition for video bitrate switching is satisfied, determine a target video bitrate to be switched to.

The target switching data determination module 320 is configured to determine, based on a playback time of a delivered audio and video frame, target switching data for switching to a target video stream corresponding to the target video bitrate.

The audio and video frame delivering module 330 is configured to in response to detecting that an audio and video frame to be delivered is consistent with the target switching data, deliver audio and video frames in the target video stream to a client in sequence.

For example, the target video bitrate determination module 310 is further configured to if receiving a request for bitrate switching sent by the client, determine the target video bitrate to be switched to based on a bitrate parameter carried in the request for bitrate switching.

For example, the target video bitrate determination module 310 is further configured to while delivering audio and video frames to the client, record a network status corresponding to the client; if the network status has changed, determine that the condition for video bitrate switching is satisfied; and determine the target video bitrate to be switched to based on the network status.

For example, the target switching data determination module 320 is further configured to determine the playback time of the delivered audio and video frame corresponding to the client, and determine the target switching data of the target video stream after the playback time, wherein the target switching data includes a target switching audio and video frame and a target switching timestamp.

For example, the audio and video frame delivering module 330 is further configured to in response to detecting that a timestamp of the audio and video frame to be delivered is inconsistent with the target switching timestamp of the target switching audio and video frame in the target switching data, send audio and video frames to be delivered corresponding to an original video bitrate to the client, wherein the original video bitrate is a bitrate before switching to the target video bitrate.

For example, the audio and video frame delivering module 330 is further configured to in response to detecting that a timestamp of the audio and video frame to be delivered is the same as the target switching timestamp of the target switching audio and video frame in the target switching data, deliver the audio and video frames in the target video stream to the client in sequence.

For example, the audio and video frame delivering module 330 is further configured to deliver a plurality of audio and video frames in the target video stream with timestamps after the target switching timestamp to the client in sequence.

The technical solution provided in this embodiment is applied to the server end. If a condition for video bitrate switching is detected to be satisfied, a target video bitrate to be switched to is determined; target switching data for switching to a target video stream corresponding to the target video bitrate is determined based on a playback time of a delivered audio and video frame, that is, the server end determines the basis for switching the video stream; in response to detecting that an audio and video frame to be delivered is consistent with the target switching data, audio and video frames in the target video stream are delivered to the client in sequence, so that the client only needs one link in the process of switching the video bitrate, which not only avoids the tedious process of creating a new link and increasing the playback logic, but also ensures the seamless connection of audio and video frames of different bitrates. At the same time, relying on a single link between the server end and the client for bitrate switching directly avoids the bandwidth competition caused by the client requesting two streams at the same time, and the bitrate switching process will not affect the quality of live streaming.

The apparatus for video bitrate switching provided in the present disclosure may perform the method for video bitrate switching provided in any embodiment of the present disclosure, and has corresponding functional modules and beneficial effects of the execution method.

It is worth noting that the plurality of units and modules included in the above apparatus are only divided according to functional logic, but are not limited to the above division, as long as the corresponding functions can be realized; in addition, the specific names of the plurality of functional units are only for the convenience of distinguishing them from each other and are not used to limit the protection scope of the disclosed embodiments.

Figure 5:
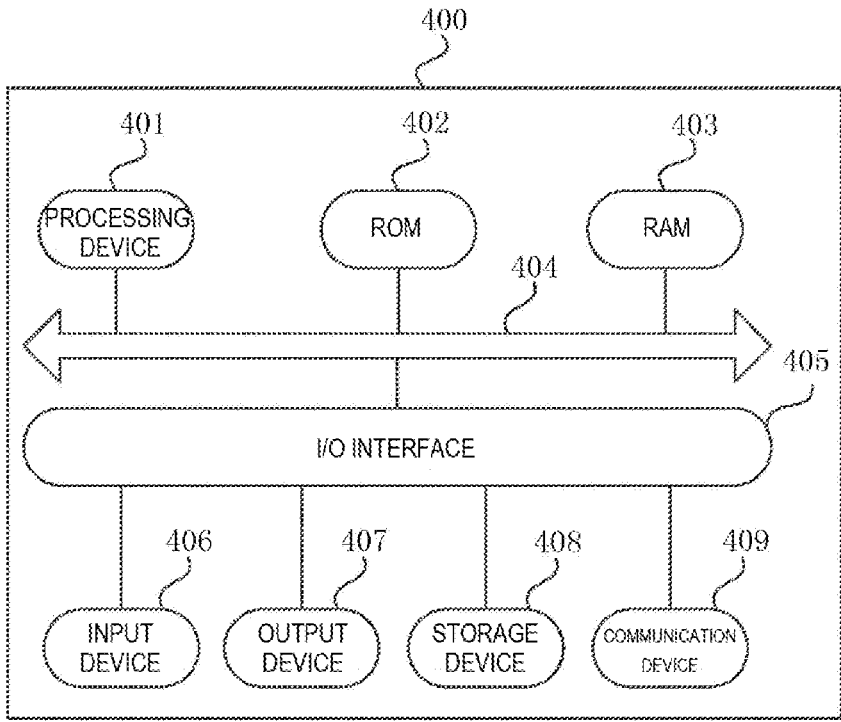
FIG. 5 is a schematic diagram of a structure of an electronic device according to an embodiment of the present disclosure.

FIG. 5 is a schematic diagram of the structure of an electronic device provided in the disclosed embodiment. Referring to FIG. 5 below, it shows a schematic diagram of the structure of an electronic device (such as an end point device or server in FIG. 5) 400 suitable for implementing the embodiments of the present disclosure. The electronic device in the embodiments of the present disclosure may include, but is not limited to, mobile terminals such as a mobile phone, a notebook computer, a digital broadcast receiver, a personal digital assistant (PDA), a PAD (tablet computer), a portable media player (PMP) and a vehicle-mounted terminal (for example, a vehicle-mounted navigation terminal), and fixed terminals such as a digital television (TV) and a desktop computer. The electronic device shown in FIG. 5 is merely an example, and should not impose any limitation to the function or the scope of application of the embodiments of the present disclosure.

As shown in FIG. 5, the electronic device 400 may include a processing device 401 (such as a central processing unit and a graphics processor), which can perform various appropriate actions and processes based on programs stored in read-only memory (ROM) 402 or loaded from storage device 406 into random access memory (RAM) 403. In RAM 403, various programs and data required for the operation of the electronic device 400 are also stored. The processing device 401, ROM 402, and RAM 403 are connected to each other through a bus 404. An input/output (I/O) interface 405 is also connected to the bus 404.

Typically, the following devices can be connected to the I/O interface 405: an input device 406 including for example a touch screen, a touch pad, a keyboard, a mouse, a camera, a microphone, an accelerometer and a gyroscope; an output device 407 including for example a liquid crystal display (LCD), a speaker and a vibrator; a storage device 406 including for example a magnetic tape and a hard disk; and a communication device 409. The communication device 409 may allow wireless or wired communication between the electronic device 400 and other devices for data exchange. Although FIG. 5 shows the electronic device 400 having various devices, it should be understood that not all the devices shown are necessarily required to be implemented or provided. More or fewer devices may alternatively be implemented or provided.

In particular, according to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flowcharts. In such an embodiment, the computer program may be downloaded and installed from the network via the communication device 409, or installed from the storage device 408, or installed from the ROM 402. The computer program, when executed by the processing unit 401, causes the processing unit to execute the above functions defined in the methods according to the embodiments of the present disclosure.

The names of the messages or information exchanged between a plurality of devices in implementations of the present disclosure are only for illustrative purposes and are not intended to limit the scope of these messages or information.

The electronic device provided by embodiments of the present disclosure and the method for video bitrate switching provided in the above embodiments belong to the same concept, technical details not described in detail in this embodiment may refer to the above embodiments, and the present embodiment has the same beneficial effect as the above embodiments.

Embodiments of the present disclosure provides a computer storage medium having a computer program stored thereon, the program is executed by a processor to achieve the method for video bitrate switching provided in the above embodiments.

IT should be noted that the computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof in the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

In some implementations, clients and servers may communicate using any currently known or future developed network protocol such as HTTP (HyperText Transfer Protocol), and may interconnect with any form or medium of digital data communication (such as communication networks). Examples of communication networks include local area networks (LANs), wide area networks (WANs), internet (such as the Internet), and end-to-end networks (such as ad hoc end-to-end networks), as well as any currently known or future developed networks.

The above computer-readable medium may be included in the above electronic device; it may also exist separately and not assembled into the electronic device. The above computer-readable medium carries one or more programs, and when the one or more programs are executed by the electronic device, cause the electronic device to:

> in response to detecting that a condition for video bitrate switching is satisfied, determine a target video bitrate to be switched to;
> determine, based on a playback time of a delivered audio and video frame, target switching data for switching to a target video stream corresponding to the target video bitrate;
> in response to detecting that an audio and video frame to be delivered is consistent with the target switching data, delivering audio and video frames in the target video stream to a client in sequence.

The computer program code for performing the operations of the present disclosure may be written in one or more programming languages or a combination thereof which include but are not limited to object-oriented programming languages Java, Sinai k, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations, or can be implemented by the combination of dedicated hardware and computer instructions.

The modules described in the embodiments of the present disclosure may be implemented by way of software or hardware. In some cases, the names of the modules do not constitute limitations to the modules themselves. For example, the associated page displaying module may also be described as "a module that displays an associated page of a first user in a predetermined application, where the associated page includes an object identifier corresponding to at least one object, the first user is an author of the at least one object, and the object is used for creating a multimedia content".

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

According to one or more embodiments of the present disclosure, [Example 1] provides a method for video bitrate switching applied to the server end, the method comprising:

> if a condition for video bitrate switching condition is detected to be satisfied, determining a target video bitrate to be switched to;
> determining, based on a playback time of a delivered audio and video frame, target switching data for switching to a target video stream corresponding to the target video bitrate; and
> in response to detecting that an audio and video frame to be delivered is consistent with the target switching data, delivering audio and video frames in the target video stream to a client in sequence.

According to one or more embodiments of the present disclosure, [Example 2] provides a method for video bitrate switching, further comprising:

> for example, if receiving a request for bitrate switching sent by the client, determining the target video bitrate to be switched to based on a bitrate parameter carried in the request for bitrate switching.

According to one or more embodiments of the present disclosure, [Example 3] provides a method for video bitrate switching, further comprising:

> for example, when delivering audio and video frames to the client, recording a network status corresponding to the client.
> if the network status has changed, determining that the condition for video bitrate switching is satisfied; and
> determining the target video bitrate to be switched to based on the network status.

According to one or more embodiments of the present disclosure, [Example 4] provides a method for video bitrate switching, further comprising:

> for example, determining the playback time of the delivered audio and video frame corresponding to the client, and determining the target switching data of the target video stream after the playback time, wherein the target switching data includes a target switching audio and video frame and a target switching timestamp.

According to one or more embodiments of the present disclosure, [Example 5] provides a method for video bitrate switching, further comprising:

for example, in response to detecting that a timestamp of the audio and video frame to be delivered is inconsistent with the target switching timestamp of the target switching audio and video frame in the target switching data, sending audio and video frames to be delivered corresponding to an original video bitrate to the client.

Herein the original video bitrate is a bitrate before switching to the target video bitrate.

According to one or more embodiments of the present disclosure, [Example 6] provides a method for video bitrate switching, further comprising:

for example, in response to detecting that a timestamp of the audio and video frame to be delivered is the same as the target switching timestamp of the target switching audio and video frame in the target switching data, delivering the audio and video frames in the target video stream to the client in sequence.

According to one or more embodiments of the present disclosure, [Example 7] provides a method for video bitrate switching, further comprising:

for example, delivering a plurality of audio and video frames in the target video stream with timestamps after the target switching timestamp to the client in sequence.

According to one or more embodiments of the present disclosure, [Example 8] provides an apparatus for video bitrate switching applied to the server end, the apparatus comprising:

a target video bitrate determination module configured to in response to a determination that a condition for video bitrate switching is satisfied, determine a target video bitrate to be switched to;

a target switching data determination module configured to determine, based on a playback time of a delivered audio and video frame, target switching data for switching to a target video stream corresponding to the target video bitrate; and an audio and video frame delivering module configured to in response to a determination that an audio and video frame to be delivered is consistent with the target switching data, deliver audio and video frames in the target video stream to a client in sequence.

In addition, although various operations are depicted in a specific order, this should not be understood as requiring these operations to be performed in the specific order shown or in a sequential order. In certain environments, multitasking and parallel processing may be advantageous. Similarly, although several specific implementation details are included in the above discussion, these should not be construed as limiting the scope of the present disclosure. Certain features described in the context of individual embodiments may also be implemented in combination in a single embodiment. Conversely, a plurality of features described in the context of a single embodiment may also be implemented in a plurality of embodiments separately or in any suitable sub-combination.

What is claimed is:

1. A method for video bitrate switching, the method applied to a server end and comprising:

in response to a determination that a condition for video bitrate switching is satisfied, determining a target video bitrate to be switched to;

determining, based on a playback time of a delivered audio and video frame, target switching data for switching to a target video stream corresponding to the target video bitrate;

in response to a determination that an audio and video frame to be delivered is consistent with the target switching data, delivering audio and video frames in the target video stream to a client in sequence; and in response to a determination that a timestamp of the audio and video frame to be delivered is inconsistent with a target switching timestamp of the target switching audio and video frame in the target switching data, sending audio and video frames to be delivered corresponding to an original video bitrate to the client, wherein the original video bitrate is a bitrate before switching to the target video bitrate.

2. The method of claim 1, wherein the in response to a determination that a condition for video bitrate switching is satisfied, determining a target video bitrate to be switched to comprises:

in response to a determination that a request for bitrate switching sent by the client is received, determining the target video bitrate to be switched to based on a bitrate parameter carried in the request for bitrate switching.

3. The method of claim 1, wherein the in response to a determination that a condition for video bitrate switching is satisfied, determining a target video bitrate to be switched to comprises:

in response to determining to deliver audio and video frames to the client, recording a network status corresponding to the client;

in response to a determination that the network status has changed, determining that the condition for video bitrate switching is satisfied; and determining the target video bitrate to be switched to based on the network status.

4. The method of claim 1, wherein the determining, based on a playback time of a delivered audio and video frame, target switching data for switching to a target video stream corresponding to the target video bitrate comprises:

determining the playback time of the delivered audio and video frame corresponding to the client, and determining the target switching data of the target video stream after the playback time, wherein the target switching data includes a target switching audio and video frame and a target switching timestamp.

5. The method of claim 1, wherein the in response to a determination that an audio and video frame to be delivered is consistent with the target switching data, delivering audio and video frames in the target video stream to a client in sequence comprises:

in response to a determination that a timestamp of the audio and video frame to be delivered is the same as the target switching timestamp of the target switching audio and video frame in the target switching data, delivering the audio and video frames in the target video stream to the client in sequence.

6. The method of claim 1, wherein the delivering audio and video frames in the target video stream to a client in sequence comprises:

delivering a plurality of audio and video frames in the target video stream with timestamps after the target switching timestamp to the client in sequence.

7. An electronic device comprising:

one or more processors, and a storage device configured to store one or more programs, the one or more programs when executed by the one or more processors, causing the one or more processors to implement operations, the operations comprising:

in response to a determination that a condition for video bitrate switching is satisfied, determining a target video bitrate to be switched to;

determining, based on a playback time of a delivered audio and video frame, target switching data for switching to a target video stream corresponding to the target video bitrate;

in response to a determination that an audio and video frame to be delivered is consistent with the target switching data, delivering audio and video frames in the target video stream to a client in sequence; and in response to a determination that a timestamp of the audio and video frame to be delivered is inconsistent with a target switching timestamp of the target switching audio and video frame in the target switching data, sending audio and video frames to be delivered corresponding to an original video bitrate to the client, wherein the original video bitrate is a bitrate before switching to the target video bitrate.

8. A non-transitory storage medium comprising computer-executable instructions, the computer-executable instructions when executed by a processor of a computer, configured to perform operations, the operations comprising:

in response to a determination that a condition for video bitrate switching is satisfied, determining a target video bitrate to be switched to;

determining, based on a playback time of a delivered audio and video frame, target switching data for switching to a target video stream corresponding to the target video bitrate;

in response to a determination that an audio and video frame to be delivered is consistent with the target switching data, delivering audio and video frames in the target video stream to a client in sequence; and in response to a determination that a timestamp of the audio and video frame to be delivered is inconsistent with a target switching timestamp of the target switching audio and video frame in the target switching data, sending audio and video frames to be delivered corresponding to an original video bitrate to the client, wherein the original video bitrate is a bitrate before switching to the target video bitrate.

9. The electronic device of claim 7, wherein the in response to a determination that a condition for video bitrate switching is satisfied, determining a target video bitrate to be switched to comprises:

in response to a determination that a request for bitrate switching sent by the client is received, determining the target video bitrate to be switched to based on a bitrate parameter carried in the request for bitrate switching.

10. The electronic device of claim 7, wherein the in response to a determination that a condition for video bitrate switching is satisfied, determining a target video bitrate to be switched to comprises:

in response to determining to deliver audio and video frames to the client, recording a network status corresponding to the client;

in response to a determination that the network status has changed, determining that the condition for video bitrate switching is satisfied; and determining the target video bitrate to be switched to based on the network status.

11. The electronic device of claim 7, wherein the determining, based on a playback time of a delivered audio and video frame, target switching data for switching to a target video stream corresponding to the target video bitrate comprises:

determining the playback time of the delivered audio and video frame corresponding to the client, and determining the target switching data of the target video stream after the playback time, wherein the target switching data includes a target switching audio and video frame and a target switching timestamp.

12. The electronic device of claim 7, wherein the in response to a determination that an audio and video frame to be delivered is consistent with the target switching data, delivering audio and video frames in the target video stream to a client in sequence comprises:

in response to a determination that a timestamp of the audio and video frame to be delivered is the same as the target switching timestamp of the target switching audio and video frame in the target switching data, delivering the audio and video frames in the target video stream to the client in sequence.

13. The electronic device of claim 7, wherein the delivering audio and video frames in the target video stream to a client in sequence comprises:

delivering a plurality of audio and video frames in the target video stream with timestamps after the target switching timestamp to the client in sequence.

14. The non-transitory storage medium of claim 8, wherein the in response to a determination that a condition for video bitrate switching is satisfied, determining a target video bitrate to be switched to comprises:

in response to a determination that a request for bitrate switching sent by the client is received, determining the target video bitrate to be switched to based on a bitrate parameter carried in the request for bitrate switching.

15. The non-transitory storage medium of claim 8, wherein the in response to a determination that a condition for video bitrate switching is satisfied, determining a target video bitrate to be switched to comprises:

in response to determining to deliver audio and video frames to the client, recording a network status corresponding to the client;

in response to a determination that the network status has changed, determining that the condition for video bitrate switching is satisfied; and determining the target video bitrate to be switched to based on the network status.

16. The non-transitory storage medium of claim 8, wherein the determining, based on a playback time of a delivered audio and video frame, target switching data for switching to a target video stream corresponding to the target video bitrate comprises:

determining the playback time of the delivered audio and video frame corresponding to the client, and determining the target switching data of the target video stream after the playback time, wherein the target switching data includes a target switching audio and video frame and a target switching timestamp.

17. The non-transitory storage medium of claim 8, wherein the in response to a determination that an audio and video frame to be delivered is consistent with the target switching data, delivering audio and video frames in the target video stream to a client in sequence comprises:

in response to a determination that a timestamp of the audio and video frame to be delivered is the same as the target switching timestamp of the target switching audio and video frame in the target switching data, delivering the audio and video frames in the target video stream to the client in sequence.

18. The non-transitory storage medium of claim 8, wherein the delivering audio and video frames in the target video stream to a client in sequence comprises:

delivering a plurality of audio and video frames in the target video stream with timestamps after the target switching timestamp to the client in sequence.

\* \* \* \* \*